United States Patent
Brown et al.

(10) Patent No.: US 11,588,315 B2
(45) Date of Patent: Feb. 21, 2023

(54) CONTROL SYSTEM FOR AN ELECTRICAL APPARATUS

(71) Applicant: Eaton Intelligent Power Limited, Dublin (IE)

(72) Inventors: Darrell Dean Brown, Grafton, WI (US); Daniel Rian Kletti, Oak Creek, WI (US); Timothy Mark Kromrey, Milwaukee, WI (US); Glen Connor Spence, New Berlin, WI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/745,146

(22) Filed: May 16, 2022

(65) Prior Publication Data
US 2022/0277911 A1     Sep. 1, 2022

Related U.S. Application Data

(62) Division of application No. 15/845,124, filed on Dec. 18, 2017, now Pat. No. 11,361,920.
(Continued)

(51) Int. Cl.
*H02H 3/05* (2006.01)
*H01H 33/666* (2006.01)
(Continued)

(52) U.S. Cl.
CPC ............ *H02H 3/05* (2013.01); *H01H 33/027* (2013.01); *H01H 33/666* (2013.01);
(Continued)

(58) Field of Classification Search
CPC .. H01H 33/027; H01H 33/666; H01H 71/123; H01H 9/54; H02H 3/006;
(Continued)

(56) References Cited

U.S. PATENT DOCUMENTS 5,210,443 A    5/1993  Kugler
5,550,459 A    8/1996  Laplace
(Continued)

FOREIGN PATENT DOCUMENTS

CN       1991650 A     7/2007
CN     101335454 A    12/2008
(Continued)

OTHER PUBLICATIONS

"Form 6 Microprocessor-Based Recloser Controls for Pole, Rack, and Yard Mount Applications Frequently Asked Questions," Cooper Power Systems, Bulletin B280-00030, Oct. 2008, pp. 1-12 (12 total pages).
(Continued)

*Primary Examiner* — Jared Fureman
*Assistant Examiner* — Nicolas Bellido
(74) *Attorney, Agent, or Firm* — DiBerardino McGovern IP Group LLC

(57) ABSTRACT

A system includes an electrical apparatus configured to monitor or control one or more aspects of an electrical power distribution network; and a control system including more than one electronic processor, where the electronic processors are configured to cause the control system to interact with the electrical apparatus, an interaction between the control system and the electrical apparatus including one or more of the control system providing information to the electrical apparatus and the control system receiving information from the electrical apparatus, and if some of the electronic processors are unable to cause the control system to interact with the electrical apparatus, at least one of the other electronic processors is able to cause the control system to interact with the apparatus.

5 Claims, 7 Drawing Sheets

Related U.S. Application Data

(60) Provisional application No. 62/443,435, filed on Jan. 6, 2017.

(51) Int. Cl.
  *H02J 13/00* (2006.01)
  *H02J 9/06* (2006.01)
  *H01H 33/02* (2006.01)
  *H01H 71/12* (2006.01)

(52) U.S. Cl.
  CPC ..... *H01H 71/123* (2013.01); *H02J 13/00002* (2020.01); *H02J 13/0004* (2020.01); *H02J 13/00022* (2020.01); *H02J 13/0075* (2013.01); *H02J 9/061* (2013.01); *H02J 13/00026* (2020.01)

(58) Field of Classification Search
  CPC ....... H02H 3/05; H02H 7/26; H02J 13/00002; H02J 13/00026; H02J 13/0004; H02J 13/0075; H02J 9/061; H04B 3/54; Y02B 70/30; Y02B 90/20; Y02E 60/00; Y02E 60/7853; Y04S 10/18; Y04S 10/20; Y04S 10/30; Y04S 20/12; Y04S 20/248; Y04S 40/126

See application file for complete search history.

(56) References Cited

U.S. PATENT DOCUMENTS

| | | | |
|---|---|---|---|
| 5,596,263 A | 1/1997 | Zavis et al. | |
| 6,816,757 B1 | 11/2004 | De La Ree et al. | |
| 6,985,784 B2* | 1/2006 | Vandevanter | H02H 7/261 |
| | | | 700/95 |
| 7,133,271 B2 | 11/2006 | Jonas et al. | |
| 7,882,220 B2 | 2/2011 | Wimmer | |
| 8,427,131 B2 | 4/2013 | Bryson et al. | |
| 8,476,874 B2 | 7/2013 | Labuschagne et al. | |
| 9,093,863 B2 | 7/2015 | Hyde et al. | |
| 9,256,232 B2 | 2/2016 | Bryson et al. | |
| 9,478,973 B2 | 10/2016 | Sundaram et al. | |
| 10,418,200 B2 | 9/2019 | Spence et al. | |
| 11,361,920 B2* | 6/2022 | Brown | H02J 13/0004 |
| 2003/0187520 A1 | 10/2003 | Pearlman et al. | |
| 2003/0212473 A1 | 11/2003 | Vandevanter | |
| 2003/0212513 A1 | 11/2003 | Vandevanter et al. | |
| 2003/0212515 A1 | 11/2003 | Fletcher et al. | |
| 2005/0273207 A1 | 12/2005 | Dougherty | |
| 2006/0187600 A1 | 8/2006 | Brown et al. | |
| 2007/0147232 A1 | 6/2007 | Takehara et al. | |
| 2010/0332877 A1 | 12/2010 | Yarch et al. | |
| 2011/0063094 A1 | 3/2011 | Meiertoberens et al. | |
| 2011/0112699 A1 | 5/2011 | Tournier et al. | |
| 2014/0125137 A1 | 5/2014 | Couture | |
| 2014/0142767 A1 | 5/2014 | Hjelm et al. | |
| 2015/0270083 A1 | 9/2015 | Masseboeuf et al. | |
| 2015/0309105 A1 | 10/2015 | Ostrovsky et al. | |
| 2016/0179118 A1 | 6/2016 | Song et al. | |
| 2016/0282892 A1 | 9/2016 | Saavedra et al. | |
| 2017/0294275 A1 | 10/2017 | Spence et al. | |
| 2019/0326755 A1 | 10/2019 | Fu et al. | |

FOREIGN PATENT DOCUMENTS

| | | |
|---|---|---|
| CN | 101821722 A | 9/2010 |
| CN | 101937265 A | 1/2011 |
| CN | 103703653 A | 4/2014 |
| CN | 104681835 A | 6/2015 |
| CN | 104953533 A | 9/2015 |
| CN | 106233553 A | 12/2016 |
| KR | 20120133917 A | 12/2012 |

OTHER PUBLICATIONS

International Search Report and Written Opinion, counterpart PCT Application No. PCT/US2017/066979, dated Apr. 16, 2018, 13 pages total.

Office Action, counterpart Chinese Patent Application No. 201780081816.3 dated Aug. 26, 2022, 36 pages total (including English translation of 20 pages).

\* cited by examiner

600

```
DETERMINE WHETHER POWER RECEIVED
AT A CONTROL SYSTEM COMES FROM A
FIRST SOURCE OR A SECOND SOURCE

610
```

↓

```
PLACE AT LEAST SOME ELECTRONIC
PROCESSORS IN ONE OF A PLURALITY OF
READINESS STATES THAT CONSUMES LESS
POWER THAN AT LEAST ONE OTHER
READINESS STATE WHEN THE RECEIVED
POWER COMES FROM THE SECOND
SOURCE

… # CONTROL SYSTEM FOR AN ELECTRICAL APPARATUS

CROSS-REFERENCE TO RELATED APPLICATION

This application is a divisional of U.S. patent application Ser. No. 15/845,124, filed on Dec. 18, 2017 and titled CONTROL SYSTEM FOR AN ELECTRICAL APPARATUS, which claims the benefit of U.S. Provisional Application No. 62/443,435, filed on Jan. 6, 2017 and titled CONTROL SYSTEM FOR AN ELECTRICAL APPARATUS, both of which are incorporated herein by reference in their entirety.

TECHNICAL FIELD

This disclosure relates to a control system for an electrical apparatus.

BACKGROUND

Switchgear, including reclosers, may be used in an electrical power distribution network to protect the network from electrical fault conditions. Fault conditions are detected by means of the switchgear monitoring currents and voltages on power distribution network. Fault conditions include transient or steady state amplitude faults as well as frequency or phase relationship faults. Under normal operating conditions, the recloser is closed, and electrical current flows through the recloser. In response to detecting a fault condition, the recloser trips or opens to prevent current from flowing through the recloser, and then opens and closes a number of times in an attempt to clear the fault. If the fault condition persists, the recloser remains open. If the fault condition clears, the recloser closes and the distribution network resumes normal operation. Relays may be used to monitor and control current flow in the distribution network. Voltage regulators may be used to monitor and control a voltage level in the distribution network. Asset monitors may be used to monitor critical assets attached to the power distribution network.

SUMMARY

In one general aspect, a system includes an electrical apparatus configured to monitor or control one or more aspects of an electrical power distribution network; and a control system including more than one electronic processor. The electronic processors are configured to cause the control system to interact with the electrical apparatus, an interaction between the control system and the electrical apparatus including one or more of the control system providing information to the electrical apparatus and the control system receiving information from the electrical apparatus. If some of the electronic processors are unable to cause the control system to interact with the electrical apparatus, at least one of the other electronic processors is able to cause the control system to interact with the apparatus.

Implementations may include one or more of the following features. Some of the electronic processors being unable to cause the control system to interact with the electrical apparatus may include some of the electrical processors being temporarily or permanently incapacitated because of processor failure, being in a reprogramming or reconfiguration state, or transitioning to another state.

The control system also may include one or more conditioning modules, and each conditioning module may be configured to sense a property of the power distribution network and generate data based on the sensed property. At least one conditioning module of the control system may be configured to sense one or more of a current of the electrical power distribution system and a voltage of the electrical power distribution system, and to generate data based on the sensed current or voltage.

The control system also may include a command module, the more than one electronic processors may be part of the command module, and the electronic processors being configured to cause the control system to interact with the electrical apparatus may include the command module being configured to generate a command signal for the electrical apparatus based on the data generated by one or more of the conditioning modules, the command signal being sufficient to cause the electrical apparatus to monitor or control one or more aspects of the power distribution network. The command signal being sufficient to control or monitor one or more aspects of the power distribution network may include the command signal being sufficient to cause the electrical apparatus to provide one or more of an operating status of the electrical apparatus or the power distribution network, diagnostic information related to the electrical apparatus or the power distribution network, and an operating mode of the electrical apparatus. The control system also may include an input interface, the command module may be configured to receive input data from the input interface, and the command signal may be based on the data from one or more of the conditioning modules and from the input interface.

The control module also may include a communications interface, the communications interface may be configured to allow any of the electronic processors to communicate with one or more of the other electronic processors.

The electronic processors may have more than one readiness state, and the electronic processors may be able to cause the control system to interact with the electrical apparatus in a first readiness state and may be unable to generate the command signal in a second readiness state. The control system may be configured to interact with the electrical apparatus by providing different types of information to the electrical apparatus or receiving different types of information from the electrical apparatus, and the electronic processors may have a third readiness state, the electronic processors may be able to provide and receive all of the different types of information in the first readiness state, and the electronic processors may be able to provide or receive at least some of the different types of information in the third readiness state. The first readiness state may be an ON state, the second readiness state may be an OFF state, and the third readiness state may be a LOW-POWER state, the third readiness state may consume less power than the first readiness state. Each of the electronic processors may be configured to determine a readiness state of any other electronic processor via the communications interface. Each of the electronic processors may be configured to change the readiness state of any other electronic processor via the communications interface.

A first set of one or more electronic processors may be configured to provide a state-change signal to a second set of one or more electronic processors, and the electronic processors of the second set of processors may change readiness state in response to receiving the state-change signal. The state-change signal may include a wake-up signal or a sleep signal, with the electronic processors of the second set of processors transitioning to the first readiness state in response to receiving the wake-up signal, and the electronic processors of the second set of processors transitioning to the second readiness state in response to receiving the sleep signal. In some implementations, the first set of electronic processors provides the state-change signal to the second set of electronic processors in response to a trigger from the command module. The trigger from the command module may be initiated from a source remote from the control system.

Each of the electronic processors may have an arming time, the arming time being a time required for the electronic processor to transition to the first readiness state after an application of power to the electronic processor, and the arming time of at least one of the electronic processors is less than the arming time of another of the electronic processors.

The electronic processors may be part of a single integrated device.

The aspect of the electrical power distribution network may include one or more of a current flow in the power distribution network and a voltage level in the power distribution network.

The electrical apparatus may include electrical contacts configured to receive current from a transmission line of the power distribution network, and the command signal from the control system may be sufficient to cause the electrical contacts to disconnect from each other to prevent current from flowing through the transmission line or connect to each other to allow current to flow through the transmission line. The electrical apparatus may include a voltage regulator, the voltage regulator including a tap changer, and the voltage regulator may adjust the tap changer to control the voltage level in the power distribution network in response to receiving the command signal from the control system.

The electrical apparatus and the control system may be integrated into a single unit.

In some implementations, the system includes an asset monitoring system, the asset monitoring system configured to monitor one or more aspects of an asset connected to the electrical power distribution network and to provide information about the one or more monitored aspects to the control system. The one or more monitored aspects may include information related to a status of an asset connected to the electrical power distribution network, the asset may include one or more of a switch, a recloser, a fuse, and a transformer. The status of the asset may include one or more of an operating capability of the asset and a health of the asset.

In another general aspect, a system includes an electrical apparatus configured to control or monitor one or more aspects of a power distribution network; and a control system configured to interact with the electrical apparatus and to receive power from the power distribution network or from a back-up energy source, the control system including a command module including more than one electronic processor, each of the electronic processors having a plurality of readiness states, the electronic processors consuming different amounts of power in each readiness state, and, when the control system receives power from the back-up energy source, the command module is configured to place at least some of the electronic processors in one of the plurality of readiness states, at least some of the electronic processors being placed in a readiness state in which the electronic processors consume less power than the electronic processors consume in at least one other readiness state.

Implementations may include one or more of the following features. The control system being configured to interact with the electrical apparatus may include the control system being configured to provide different types of command signals to the electrical apparatus, the command signals being sufficient to cause the electrical apparatus to control or monitor one or more aspects of the electrical power distribution network, and when the control system receives power from the back-up energy source, the command module is able to generate at least one command signal for the electrical apparatus. The readiness states may include a first readiness state, a second readiness state, and a third readiness state, the electronic processors consuming less power in the third readiness state than in the first readiness state and less power in the second readiness state than the third readiness state, and, when the control system receives power from the back-up energy source, at least some of the electronic processors are placed in the second readiness state or the third readiness state. In some implementations, when the control system receives power from the back-up energy source, at least some of the electronic processors are placed in or remain in the first readiness state. The electronic processors may be capable of generating any of the command signals for the electrical apparatus in the first readiness state, none of the command signals for the electrical apparatus in the second readiness state, and fewer than all of the command signals for the electrical apparatus in the third readiness state.

The control system also may include a communications interface, the communications interface configured to allow any of the electronic processors to communicate with one or more of the other electronic processors and at least one of the electronic processors provides a state-change signal to one or more of the other electronic processors. The control system may include a conditioning module configured to measure an amount of current or voltage present in the power distribution network and to generate data based on this measurement.

The electrical apparatus may include electrical contacts configured to control current on a transmission line of the power distribution network, and a command signal from the control system may be sufficient to cause the electrical contacts to disconnect from each other to prevent current from flowing through the transmission line or connect to each other to allow current to flow through the transmission line. When the control system receives power from the back-up energy source, a first set of the electronic processors may be placed in the third readiness state, and the first set of the electronic processors in the third readiness state may generate a command signal when the data from the conditioning module indicates that the amount of sensed current exceeds a threshold, the command signal being sufficient to cause the electrical apparatus to disconnect the contacts.

The control system also may include an input interface, the input interface being configured to receive a configuration setting for the command module, the configuration setting defining the state to place each electronic processor in when the control system transitions between receiving energy from the power distribution network and the backup energy source, and the command module may be configured to place each of the electronic processors in the readiness state specified in the configuration setting.

The command module may be configured to place at least some of the electronic processors in the one of the plurality of readiness states after a pre-determined amount of time has passed since the control system started receiving power from the back-up energy source.

In another general aspect, a method of operating an electrical apparatus in an electrical power distribution network includes interacting with the electrical apparatus at a command module of a control system, the command module including a plurality of electronic processors, each of the plurality of electronic processors being associated with a plurality of readiness states, and at least one of the plurality of electronic processors being in a readiness state in which the electronic processors are able to interact with the electrical apparatus and at least one of the plurality of electronic processors being in a readiness state in which the electronic processors are not able to interact with the electronic processor, where the electrical apparatus is configured to monitor or control one or more aspects of the electrical power distribution network, and interacting with the electrical apparatus includes one or more of sending information to the electrical apparatus and receiving data from the electrical apparatus.

The method also may include receiving an indication of a sensed property of an electrical power distribution network; generating data based on the received indication; and generating a command signal based on the generated data, where interacting with the electrical apparatus may include causing the command module to send the command signal to the electrical apparatus, the electrical apparatus being configured to control or monitor one or more aspects of the electrical power distribution network in response to receiving the command signal.

In another general aspect, a method of operating an electrical apparatus that controls or monitors one or more aspects of an electrical power distribution network includes receiving power at a control system; determining whether the received power comes from a first source or a second source, the first source being the electrical power distribution network and the second source being a back-up energy source; and placing at least some electronic processors in one of a plurality of readiness states when the received power comes from the second source, where, when the electronic processor is in the one of the plurality of readiness states the electronic processor consumes less power than the electronic processor does in at least one other readiness state of the electronic processors.

In another general aspect, a control system for use with an electrical apparatus that controls or monitors one or more aspects of an electrical power distribution network includes a command module including a plurality of electronic processors, the electronic processors being associated with a plurality of readiness states, each readiness state defining a scope of operations that the electronic processors are able to perform when in the readiness state; and a processor communication interface, the processor communication interface connecting the electronic processors and being configured to provide data from any of the electronic processors to any other electronic processors, where the control system is configured to receive power from one of the electrical power distribution network and a back-up energy source, and when the control system receives power from the back-up energy source, at least some of the electronic processors are placed in a readiness state that consumes less power than at least one other readiness state.

Implementations of any of the techniques described herein may include an electrical apparatus, a control system, a system that includes a control system and an electrical apparatus, a device for protecting an electrical power distribution network, a device for monitoring and/or controlling an aspect of an electrical power distribution network, a kit for retrofitting a control system, an electrical apparatus with an integrated control system, instructions stored on a non-transient machine-readable computer medium, and/or a method. The details of one or more implementations are set forth in the accompanying drawings and the description below. Other features will be apparent from the description and drawings, and from the claims.

DRAWING DESCRIPTION

FIG. 6 is a flow chart of an example of a process for operating an electrical apparatus.

DETAILED DESCRIPTION

Figure 1:
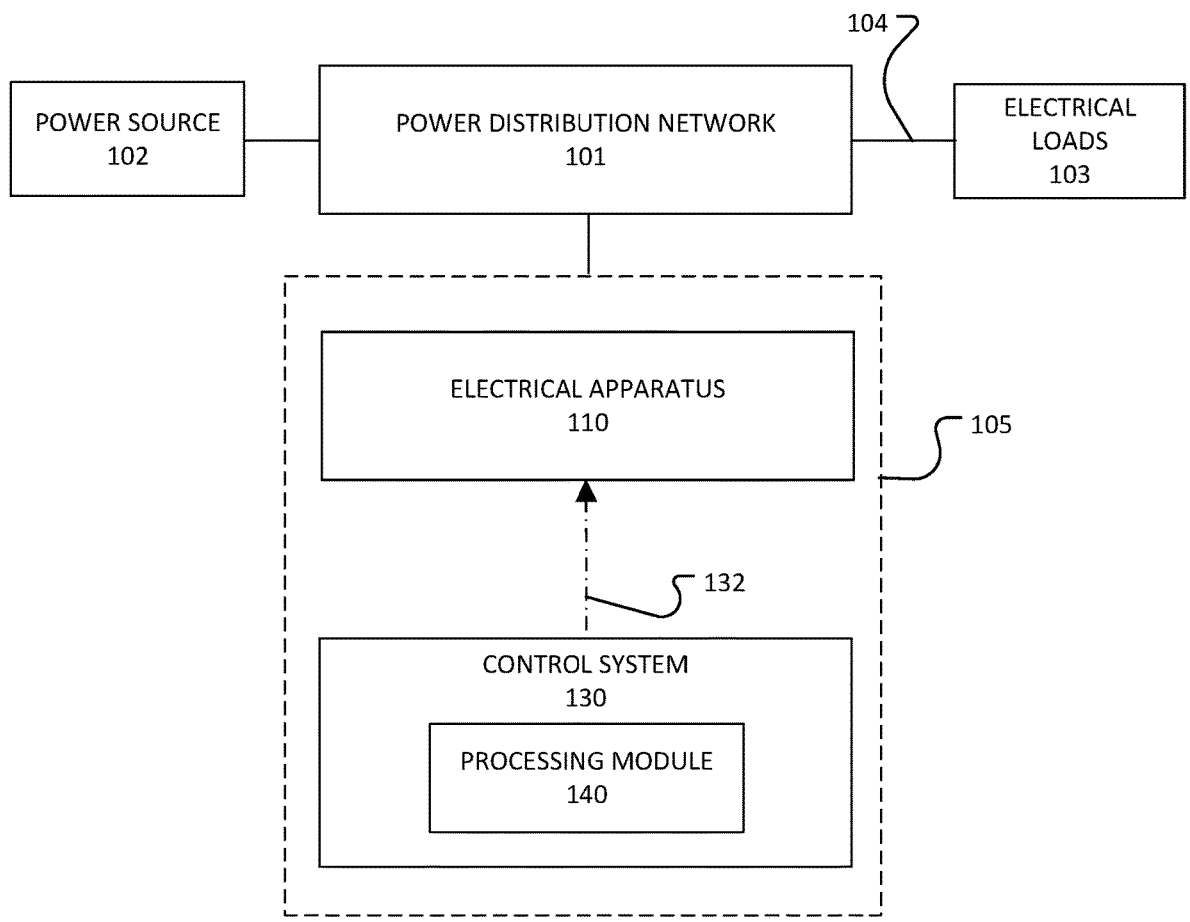
FIGS. 1 and 2 are block diagrams of examples of electrical power systems.

FIG. 1 is a block diagram of an example of an electrical power system 100. The power system 100 includes an electrical power distribution network 101, which transfers electricity from a power source 102 to electrical loads 103 via a transmission path 104, and a system 105, which includes an electrical apparatus 110 and a control system 130.

The electrical apparatus 110 is any device or apparatus that may be used to monitor and/or control the electrical power distribution network 101 or a portion of the network 101. For example, the electrical apparatus 110 may be any apparatus, device, or system capable of controlling and/or monitoring one or more aspects of the network 101. The control system 130 may be any system capable of communicating or interacting with the electrical apparatus 110.

The electrical power distribution network 101 may be, for example, an electrical grid, an electrical system, or a multi-phase electrical network that provides electricity to commercial and/or residential customers. The power distribution network 101 may have an operating voltage of, for example, at least 1 kilovolt (kV), up to 34.5 kV, up to 38 kV, or 69 kV or higher, and may operate at a fundamental frequency of, for example, 50-60 Hertz (Hz). The transmission path 104 may include, for example, one or more transmission lines, electrical cables, and/or any other mechanism for transmitting electricity.

The control system 130 interacts with the electrical apparatus 110 by sending information to the electrical apparatus 110 and/or receiving information from the electrical apparatus 110. For example, the control system 130 may interact with the electrical apparatus 110 by generating a command signal 132 for the electrical apparatus 110 and providing the command signal 132 to the electrical apparatus 110. The command signal 132 includes data or information that is sufficient to cause the electrical apparatus 110 to control and/or monitor one or more aspects of the power distribution network 101. An apparatus 110 that is configured to control one or more aspects of the power distribution network 101 can provide protection to the electrical loads 103, the network 101, and/or the power source 102. An apparatus 110 that is configured to monitor one or more aspects of the power distribution network 101 may, for example, provide information about the network 101 to the control system 130 that enables more efficient and robust operation of the network 101. The electrical apparatus 110 may be configured to control one or more aspects of the electrical power distribution network 101, monitor one or more aspects of the electrical power distribution network 101, or monitor and control one or more aspects of the electrical power distribution network 101.

The control system 130 includes a processing module 140. The processing module 140 has more than one electronic processor, and the electronic processors of the processing module 140 are coordinated and operated in such a manner that the control system 130 is a redundant system. In other words, the control system 130 is able to interact with the electrical apparatus 110 even if some of the electronic processors of the processing module 140 are not fully operational or are completely incapacitated. For example, the control system 130 is able to generate the command signal 132 and operate the electrical apparatus 110 even when some of the electronic processors are unable to generate the command signal 132. As such, the system 105 is able to provide robust and redundant protection and/or monitoring of the electrical loads 103 and/or the power distribution network 101 even when some of the electronic processors of the processing module 140 are unavailable due to, for example, a lack of power, being in a failure mode, rebooting, transitioning to another state, being in a reconfiguration state, or receiving a firmware update.

Additionally or alternatively, the control system 130 may use the multiple electronic processors to operate in a conservation mode, which uses less energy than a typical operating mode but still is cable of commanding the electrical apparatus 110 to protect or monitor the power distribution network 101 and/or provide other functionality. In some implementations, the control system 130 is able to operate the electrical apparatus 110 with a back-up energy source that has less capacity than what would be required to back up the entire system.

Figure 2:
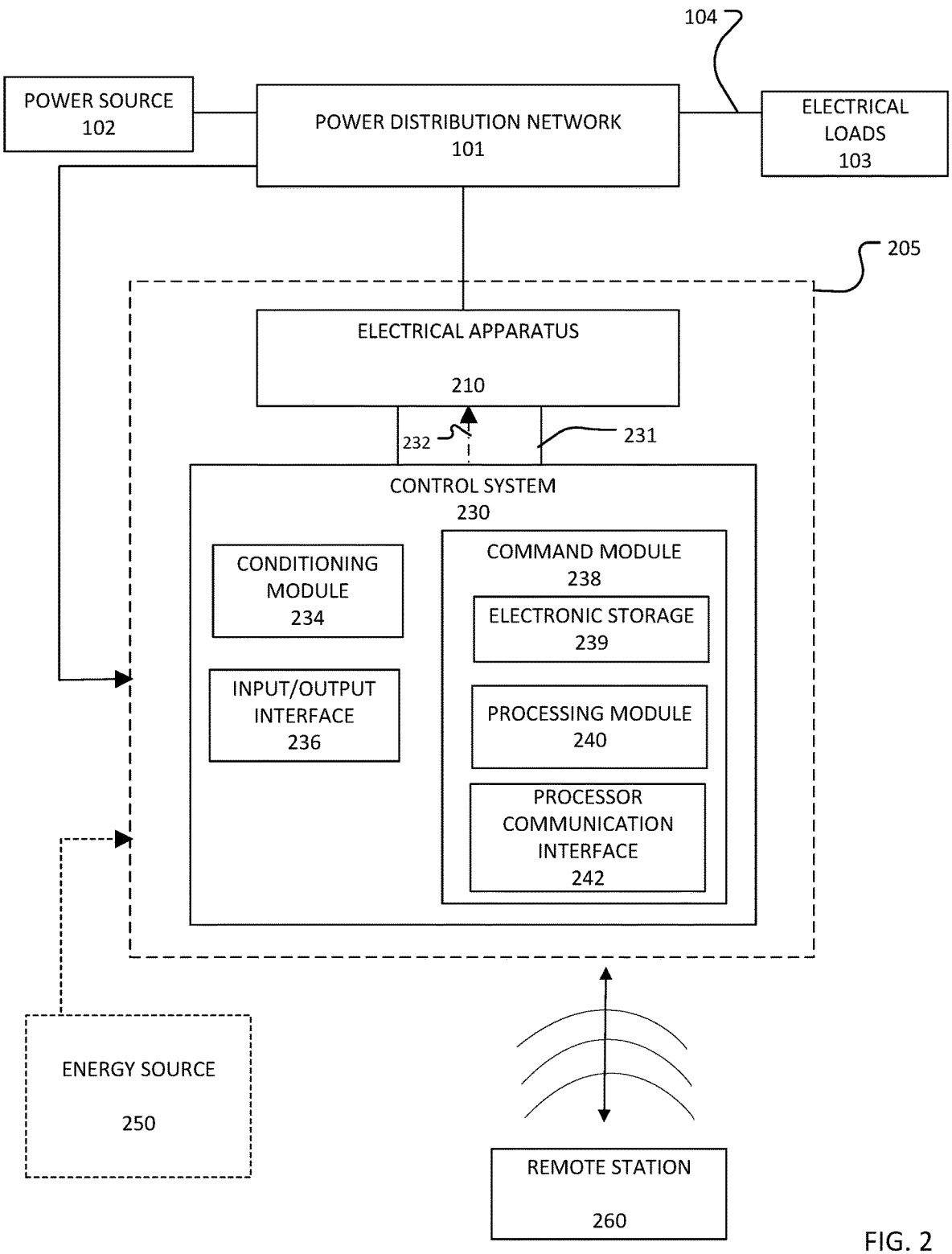

Referring to FIG. 2, block diagram of an example of a power system 200, which includes a system 205 for monitoring and/or controlling one or more aspects of the power distribution network 101, is shown. The system 205 includes an electrical apparatus 210 and a control system 230, which communicates or interacts with the electrical apparatus 210 via a data connection 231. The data connection 231 may be a physical control cable that is connected to the electrical apparatus 210 and the control system 230, or the data connection 231 may be a wireless connection. The system 205 may be a single integrated unit that includes both the electrical apparatus 210 and the control system 230.

The control system 230 may interact with the electrical apparatus 210 by sending information to the electrical apparatus 210 and/or receiving information from the electrical apparatus 210 via the data connection 231. The information may be status or diagnostic information that the electrical apparatus 210 provides to the control system 230. This information may include, for example, one or more indications related to the health or operating mode of the electrical apparatus 210. In yet another example, the information may be data obtained by the electrical apparatus 210 and provided to the control system 230, such as, for example, current and voltage levels on the electrical power distribution network 101.

In some implementations, the control system 230 may communicate or interact with the electrical apparatus 210 by providing a command signal 232 to the electrical apparatus 210. The command signal 232 includes data or information sufficient to cause the electrical apparatus 210 to monitor and/or control an aspect of the power distribution network 101. For example, in response to receiving the command signal 232, the electrical apparatus may start or stop the current flow in the transmission path 104, monitor an amount of current flowing in the transmission path 104 or a voltage level of the network 101, and/or change the voltage level of the network 101. In some implementations, an aspect of the power distribution network 101 is monitored by obtaining information related to the electrical apparatus 210. For example, the command signal 232 may be used to determine the operating state or capability of the electrical apparatus 210 by monitoring temperature, air pressure, humidity, and/or air quality at the electrical apparatus 210 or by monitoring maintenance-related data such as operation counters and other apparatus parameters. The command signal 232 may include data or information that allows the configuration or the operating mode of the electrical apparatus 210 to be changed, and the command signal 232 may include information that represents user-programmable inputs and/or outputs.

The control system 230 includes a conditioning module 234, which senses a property of the power distribution network 101 and produces data based on the sensed property, an input/output (I/O) interface 236, and a command module 238. The command module 238 causes the control system 230 to interact with the electrical apparatus 210, for example, by generating the command signal 232 or allowing the control system 230 to receive information from the electrical apparatus 210. The command module 238 includes a processing module 240, which includes more than one electronic processor. The command signal 232 may be based on the data from the conditioning module 234. In some implementations, the command signal 232 also may be based on data entered into the I/O interface 236.

Under ordinary operating conditions of the system 200, the control system 230 receives power from the power distribution network 101. However, the system 200 also may include a back-up energy source 250, which provides power to the control system 230 when the power distribution network 101 is unable to provide power. For example, the back-up energy source 250 may provide power to the control system 230 when electricity is not able to flow in the transmission path 104 due to a fault condition on the power distribution network 101. Additionally, the back-up energy source 250 may provide power to other portions of the system 205, including the electrical apparatus 210. In some implementations, the back-up energy source 250 may be strategically restricted to energizing only some of the multiple processors in the processing module 240 to extend the backup period. The back-up energy source 250 may be, for example, a battery, a solar panel, a fuel cell, a capacitor bank, or a combination of such devices.

The processing module 240 of the command module 238 includes more than one electronic processor. The electronic processors of the processing module 240 are associated with readiness states, with each readiness state defining a scope of operations that the electronic processor is permitted to perform while in the readiness state. The power consumption of the electronic processor also may depend on the readiness states. The readiness states of the processors are leveraged to form a redundant control system, or the readiness states also may be used to operate the control system 230 in a conservation mode that consumes less power than a typical operating mode while the back-up energy source 250 provides power to the system 205.

The conditioning module 234 may sense, for example, an amount of current that is flowing in the transmission path 104 or an amount of voltage on the transmission path 104. The conditioning module 234 may include components, such as, for example, voltage or current transducers, an electronic processor, electronic storage media, and an analog-to-digital converter (ADC). In implementations in which the network 101 is a multi-phase network and the electrical apparatus 210 controls and/or monitors more than one phase, the conditioning module 234 may include a voltage or current transducer, and an ADC for each phase. The conditioning module 234 is electrically connected to the power distribution network 101. Thus, the conditioning module 234 may measure or sense a property of the network 101 directly and without operator intervention. The conditioning module 234 produces data based on the sensed property of the power distribution network 101, and provides the data to the command module 238.

The I/O interface 236 may be any interface that allows a human operator and/or an autonomous process to interact with the control system 230. The I/O interface 236 may include, for example, a display, a keyboard, audio input and/or output (such as speakers and/or a microphone), a serial or parallel port, a Universal Serial Bus (USB) connection, and/or any type of network interface, such as, for example, Ethernet. The I/O interface 236 also may allow communication without physical contact through, for example, an IEEE 802.11, Bluetooth, or a near-field communication (NFC) connection. The control system 230 may be, for example, operated, configured, modified, or updated through the I/O interface 236.

The I/O interface 236 also may allow the control system 230 to communicate with systems external to and remote from the system 205. For example, the I/O interface 236 may include a communications interface that allows communication between the control system 230 and a remote station 260, or between the control system 230 and an electrical apparatus other than the apparatus 210, through the I/O interface 236 using, for example, the Supervisory Control and Data Acquisition (SCADA) protocol or another services protocol, such as Secure Shell (SSH) or the Hypertext Transfer Protocol (HTTP). The remote station 260 may be any type of station through which an operator is able to communicate with the control system 230 without making physical contact with the control system 230. For example, the remote station 260 may be a computer-based work station, a smart phone, tablet, or a laptop computer that connects to the control system 230 via a services protocol, or a remote control that connects to the control system 230 via a radio-frequency signal.

The command module 238 includes an electronic storage 239 and the processing module 240. The processing module 240 includes least two electronic processors, and may include any number of processors greater than two. The electronic processors of the processing module 240 may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC). All of the processors of the processing module 240 may be the same, or the processing module 240 may include processors that have different characteristics. The electronic storage 239 may be any type of electronic memory that is capable of storing data, and the electronic storage 239 may include volatile and/or non-volatile components. The electronic storage 239 and the processing module 240 are coupled such that the processing module 240 may access or read data from the electronic storage 239 and may write data to the electronic storage 239.

The command module 238 also may include a processor communication interface 242, which allows the electronic processors of the processing module 240 to exchange data with each other. The processor communication interface 242 may be a bi-directional communications interface that allows any processor of the processing module 240 to send data to and receive data from any other processor of the processing module 240. The interface 242 may be any type of data bus and associated protocol. For example, the interface 242 may be a parallel or serial interface such as Peripheral Component Interconnect (PCI) bus, Peripheral Component Interconnect-Express (PCIe) bus, serial peripheral interface (SPI), inter-IC bus (I2C), serial advanced technology attachment (SATA), parallel ATA (PATA), controller area network bus (CANbus), universal serial bus (USB), Ethernet or a proprietary bus implementation. The command module 238 may include more than one processor communications interface 242 such that individual processors of the processing module 240 may be connected to some other processors of the processing module 240 without necessarily being connected to all of the other processors of the processing module 240.

The electronic processors of the processing module 240 have readiness states. A readiness state defines the type and/or scope of operations that an electronic processor is capable of performing. The electronic processor may be capable of performing operations of a different type and/or scope in each of the various readiness states, though some operations may be permitted in more than one readiness state. The command module 238 controls the readiness state of the processors of the processing module 240. In this way, the command module 238 allows the control system 230 to be redundant and/or enables the control system 230 to consume less energy while providing sufficient functionality to the electrical apparatus 210.

For example, the electronic processors of the processing module 240 are able cause the control system 230 to interact with the electrical apparatus 210 in some but not all readiness states. The electronic processors of the processing module 240 may be able to generate the command signal 232 in some but not all of the readiness states, for example. However, because the processing module includes more than one electronic processor, and the readiness states of the various processors of the processing module 240 may be controlled by the command module 238, the command module 238 is able to interact with the electrical apparatus 210 even when some of the processors of the processing module 240 are not in a readiness state that is able to cause the command module 238 to interact with the electrical apparatus 210. For example, in implementations in which the command signal 232 is generated, the command module 238 is able to provide the command signal 232 to the electrical apparatus 210 even when some of the processors of the processing module 240 are unable to produce the command signal 232.

The readiness states of the electronic processors of the processing module 240 may include an ON readiness state, an OFF readiness state, and a sleep state. In the ON readiness state, an electronic processor receives power and is fully functional. For example, in the ON readiness state, the electronic processor is able to produce the command signal 232. An electronic processor in the OFF readiness state is not able to produce the command signal 232. When in the sleep state, an electronic processor receives power and may be able to perform some computational tasks and operations, but may be unable to generate the command signal 232. The processors of the processing module 240 also may have a low-power readiness state. An electronic processor in the low-power readiness state may be able to generate the command signal 232.

In some implementations, the control system 230 produces more than one type of command signal 232, and, in these implementations, a processor of the processing module 240 may be able to generate some but not all of the types of command signals when in the low-power readiness state. Additionally, a processor in the low-power readiness state may be able to receive and process data input through the I/O interface 236. In other words, it is possible that a processor in the low-power readiness state has partial functionality as compared to a processor in the ON readiness state.

The processors of the processing module 240 may have other readiness states. For example, a processor of the processing module 240 may enter a write state when writing data to the electronic storage 239, and a read state when reading data from the electronic storage 239. The read and write states may occur, for example, when the control system 230 receives a firmware update. An electronic processor in the write state, the read state, or a booting state, which occurs during a transition from the OFF readiness state to the ON readiness state, may be unable to cause the command module 238 to interact with the electrical apparatus 210 (for example, an electronic processor in any of these states may be unable to generate the command signal 232).

Transitions between states take a finite amount of time. For example, an electronic processor transitions from the OFF readiness state to the ON readiness state at some time after power is applied to the electronic processor. The amount of time required for an electronic processor to transition from the OFF readiness state to the ON readiness state is the "arming time" of the electronic processor. The electronic processor may transition to the OFF readiness state or the ON readiness state from the sleep state. Transitioning from the sleep state to the ON readiness state requires a finite amount of time, which may be less than the "arming time," but the electronic processor does not enter the booting state when transitioning from the sleep state to the ON readiness state. Additionally, the electronic processor may be in a different state while transitioning between two readiness states. For example, when an electronic processor transitions from the OFF readiness state to the ON readiness state, the electronic processor enters the booting readiness state prior to reaching the ON readiness state.

Furthermore, using one or more electronic processors with a relatively short "arming time" may allow the control system 230 to operate the electrical apparatus 210 without relying on the back-up energy source 250. For example, when a power outage exists in the electrical distribution network 101, the back-up energy source 250 may provide power to the control system 230, ensuring that power is available to the control system 230 immediately when service is restored to the network 101 and thus preventing a time period in which the electrical apparatus 210 does not protect and/or monitor the network 101. However, an electronic processor that has a relatively short "arming time" transitions from the OFF readiness state to the ON readiness state almost immediately after power-up (such as when power is restored to the electrical power distribution network 101). As such, by including one or more electronic processors with a short "arming time" in the processing module 240, the control system 230 is able to operate the apparatus 210 almost immediately after power is restored, mitigating or eliminating the need for the back-up energy source 250.

An electronic processor also may consume different amounts of power in different readiness states. For example, a processor in the ON readiness state consumes more power than a processor in the low-power readiness state, the sleep state, or the OFF readiness state. A processor in the low-power readiness state may consume more power than a processor in the sleep or OFF readiness states. Thus, the amount of energy consumed by the control system 230 may be reduced by controlling the readiness state of the processors of the processing module 240, taking into account the operations available in each readiness state to ensure that the command module 238 remains able to generate the command signal 232 and/or provide other functionality (such as receiving and/or providing information to the electrical apparatus 210).

In other words, the readiness states of the processors of the processing module 240 determine the overall functionality and the energy consumption of the command module 238. Thus, controlling the readiness state of each of the processors of the processing module 240 allows control of the functionality and/or the energy consumption of the command module 238 and the control system 230.

To control or select the readiness state of the processing module 240, the command module 238 or the control system 230 may provide triggers to individual processors, or one or more of the processors may provide a trigger signal to another of the processors via the processor communication interface 242. The trigger signals may be provided in a manner or pattern that is specified by a configuration file or computer program stored on the electronic storage 239. Additionally or alternatively, the trigger signals may be provided in manner specified by an operator of the system 205 through the I/O interface. For example, in implementations that include a configuration file, the configuration file may be updated or replaced by the operator of the system 205 through the I/O interface 236. Additionally, an electronic processor may change readiness states due to an unintentional event inside or external to the control system 230. For example, an electronic processor may enter the OFF readiness state due to processor failure or may enter the sleep state due to an unexpected decrease in power availability due to power distribution network 101 conditions.

In another example, an operator of the control system 230 may trigger the processors of the processing module 240 directly through the I/O interface 236. The I/O interface 236 may allow an operator to enter the desired state for one or more of the processors of the processing module 240 or a trigger to cause one or more of the processors of the processing module 240 to change readiness state. In these implementations, the operator may manipulate the I/O interface 236 to enter configuration data into the control system 230. For example, the I/O interface 236 may include a physical panel or a graphical user interface that is presented on a display. Additionally, the operator or an autonomous process may access information about the system 205, such as data from the electrical apparatus 210, through the I/O interface 236. The I/O interface 236 also may couple to the data connection 231 to send data to and receive data from the electrical apparatus 210.

Figure 3A:
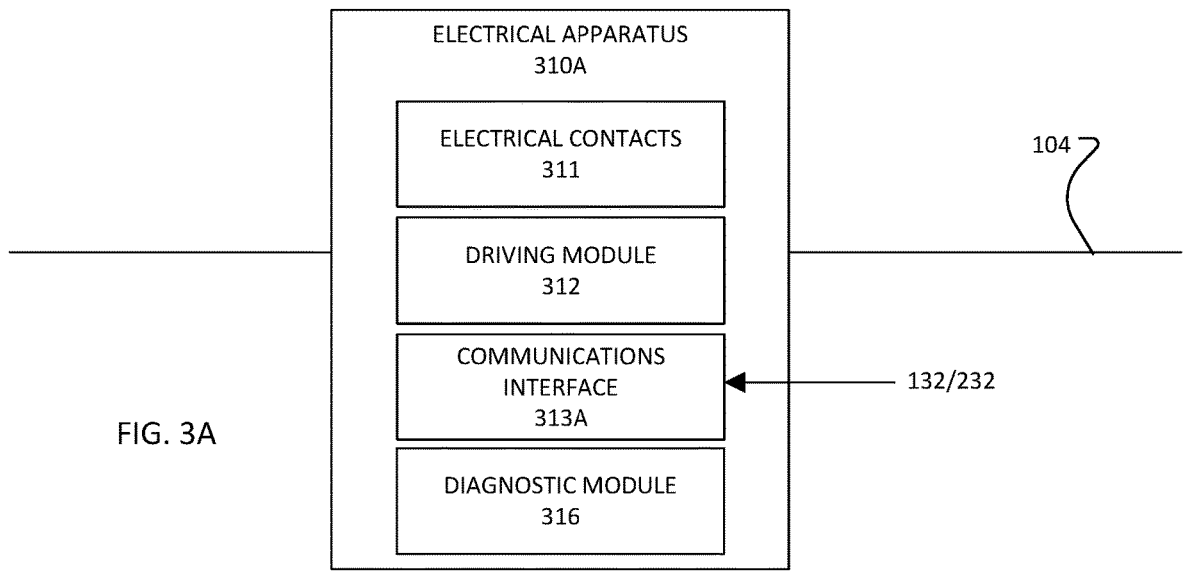
FIGS. 3A and 3B are block diagrams of example electrical apparatuses that may be used in the electrical power systems of FIGS. 1 and 2.
Figure 3B:
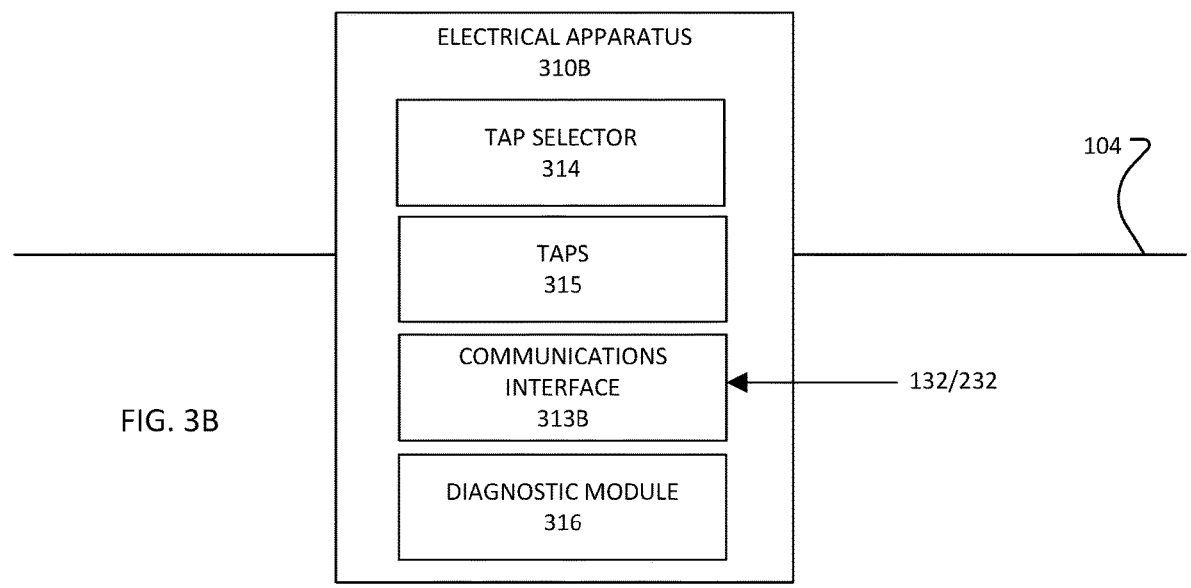

Referring to FIGS. 3A and 3B, block diagrams of example implementations of the electrical apparatus 110 and the electrical apparatus 210 are shown.

FIG. 3A is a block diagram of an electrical apparatus 310A, which may be any electrical apparatus that is capable of opening and closing the transmission path 104. The apparatus 310A may be, for example, a circuit breaker, switch, or a recloser. The apparatus 310A includes electrical contacts 311, a driving module 312, and a communications interface 313A for receiving data from and/or sending data to a control system such as the control system 130 (FIG. 1) or the control system 230 (FIG. 2). The electrical apparatus 310A also includes a diagnostic module 316, which measures or extracts environmental information and/or diagnostic information. For example, the diagnostic module 316 may measure environmental information, such as temperature, humidity, air quality, and/or air pressure in the vicinity of the electrical apparatus 310A. In these implementations, the diagnostic module 316 may include one or more environmental sensors such as, for example, a thermometer, a moisture monitor, a barometer, or any other environmental sensor. The diagnostic module 316 also may include one or more diagnostic sensors or measurement devices such as a health monitor, a monitor that tracks the total time in which the electrical apparatus 310A has been deployed, and/or a monitor that tracks the number of times the electrical apparatus 310A has operated. The electrical apparatus 310A may be integrated with a control system 230 in a single unit and located together at a monitoring or control point of the electrical power distribution network 101. In some implementations, the electrical apparatus 310A and the control system 230 are separate units that are connected by a control cable or wireless data communication link, such as the data connection 231 (FIG. 2).

The apparatus 310A controls and/or monitors the flow of current in the transmission path 104 with the contacts 311. When the contacts 311 are connected to each other or closed, current is able to flow through the apparatus 310A and in the transmission path 104. When the contacts are disconnected from each other or opened, current is not able to flow through the apparatus 310A or the transmission path 104. Thus, by opening and closing the contacts 311, the flow of current in the transmission path 104 may be controlled.

To open and/or close the contacts 311, one or more of the contacts 311 may be moved by the driving module 312. The driving module 312 may include electrical and/or mechanical components that drive the contacts 311 to open and close. For example, the driving module 312 may include electronics, springs, motors, and mechanical linkages that operate to cause one or more of the contacts 311 to move to connect or disconnect from each other.

The opening and/or closing of the contacts 311 may be initiated by a command signal (such as the command signal 132 or 232) received by the communications interface 313A. In this way, the command signal operates the apparatus 310A to control the flow of electricity in the transmission path 104. Additionally, the apparatus 310A may be used to monitor the transmission path 104. For example, an amount of current flowing in the transmission path 104 may be measured when the contacts 311 are closed and in response to a command signal received by the communications interface 313A. In another example, a voltage level at the transmission path 104 may be measured with the contacts 311 opened and/or closed in response to receiving a command signal. Thus, the apparatus 310A may be used to monitor and/or control the power distribution network 101.

FIG. 3B is a block diagram of the electrical apparatus 310B, which monitors and controls a voltage level in the power distribution network 101 (FIG. 1). For example, the electrical apparatus 310B may be a voltage regulator that monitors and controls the voltage level at the transmission path 104 such that the voltage delivered to the electrical loads 103 (FIG. 1) is maintained within a pre-defined range despite changes in the load on the transmission path 104.

The electrical apparatus 310B includes a tap selector 314, taps 315, and a communications interface 313B, which receives the command signal 132 or 232 and may be similar to the communications interface 313A. The electrical apparatus 310B also may include the diagnostic module 316. The tap 315 may be a device, such as a coil or transformer, that has a variable voltage that is controllable by the location of a tap on the coil. The location of the tap is varied by the tap selector 314 to control the voltage on the power distribution network 101. The tap selector 314 may include motors, mechanical linkages, and/or electronic circuitry to move the tap and control the voltage.

Figure 3C:
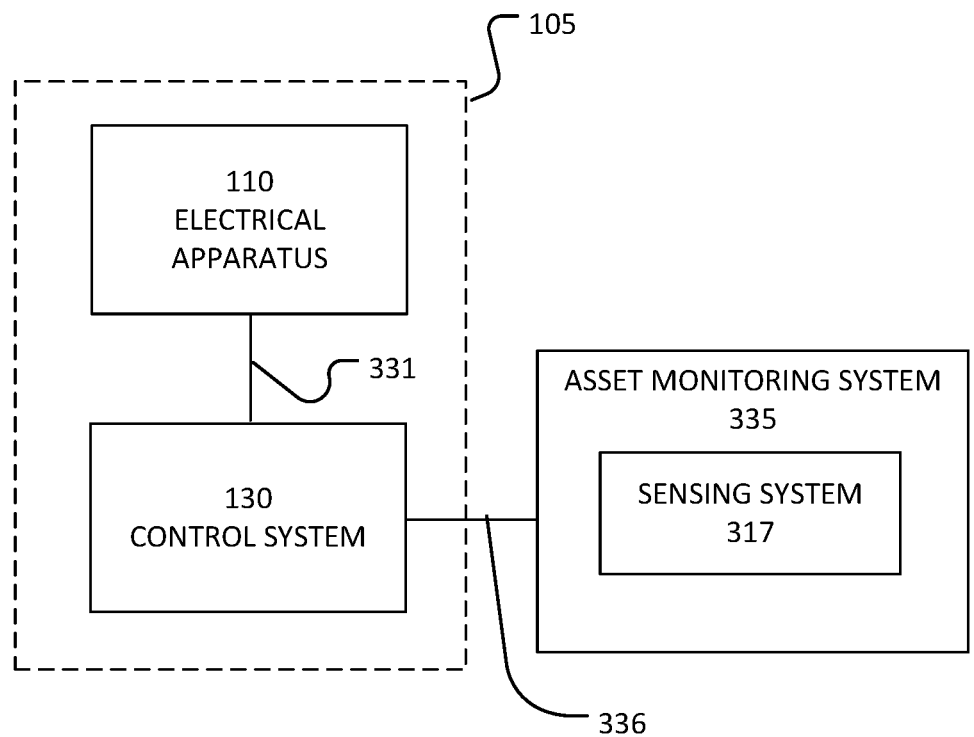
FIG. 3C is a block diagram of an example of an asset monitoring system that may be used in the electrical power systems of FIGS. 1 and 2.

FIG. 3C is a block diagram of the system 105 (FIG. 1) with an exemplary asset monitoring system 335. The asset monitoring system 335 communicates with the control system through a data connection 336. The data connection 336 may be any wired or wireless connection capable of transmitting data. The asset monitoring system 335 of FIG. 3C is shown with the control system 130 for discussion purposes, but the asset monitoring system 335 may be used with other control systems, such as the control system 230 (FIG. 2). The asset monitoring system 335 may be integrated with the control system 130 in a single unit and located at a monitoring or control point of the electrical power distribution network 101. In some implementations, the asset monitoring system 335 and the control system 130 are separate units that are coupled only by the data connection 336, such as shown in FIG. 3C.

The asset monitoring system 335 may send information to and/or receive information from the control system 130 via the data connection 336. The asset monitoring system 335 is used to monitor an asset that is associated with the power distribution network 101. For example, the asset monitoring system 335 may be used to monitor the health and/or operating status of critical assets, such as the apparatus 130. The asset monitoring system 335 also may be used to monitor critical assets such as the apparatus 310A (FIG. 3A) or the apparatus 310B (FIG. 3B). Additionally or alternatively, the asset monitoring system 335 may monitor less sophisticated devices such as transformers and fuses. Further, the asset monitoring system 335 may monitor a system that includes an electrical apparatus.

The asset monitoring system 335 typically does not provide direct control of one or more aspects of the electrical power distribution network 101, but the asset monitoring system 335 is able to monitor one or more aspects of the assets connected to the power distribution network 101. For example, the asset monitoring system 335 can provide an indication of the capability and health of one or more monitored assets to the control system 130. In some implementations, the asset monitoring system 335 includes a sensing system 317, which includes one or more sensors or devices configured to measure physical properties that provide status information about the monitored asset. For example, the sensing system 317 may include one or more temperature sensors, moisture sensors, weight sensors, pressure sensors, current and/or voltage sensors, position sensor, acceleration sensor, operational counter, or a combination of such sensors or devices. The sensing system 317 also includes associated electronic components (such as power supplies, electronic processors, and electronic memory media) and/or mechanical components (such as housings, insulation, and mounting systems) for operating the sensors of the sensing system 317.

The asset monitoring system 335 may be triggered to monitor the monitored asset in response to receiving a command signal from the control system 130. In some implementations, the asset monitoring system 335 provides sensor data to the control system 130 periodically, when the sensor data meets predetermined conditions, when the control system polls the asset monitoring system, or based on other criteria and not necessarily in response to receiving a command signal from the control system 130. Regardless, the control system 130 interacts with the asset monitoring system 335 by receiving information from the asset monitoring system 335. In some implementations, the control system 130 also may interact with the asset monitoring system 335 in other ways, for example, by sending a command signal or other information to the asset monitoring system 335.

The electrical apparatuses 310A and 310B are provided as examples of electrical apparatuses that may be used with a control system such as the control system 130 or the control system 230. The asset monitoring system 335 may be used with the electrical apparatuses 110, 220, 310A, or 310B. However, other implementations of the electrical apparatus are possible. For example the electrical apparatus may be a device, such as a switch, that controls one or more aspects of the electrical power distribution network 101 but does not necessarily monitor any aspect of the network 101.

Figure 4:
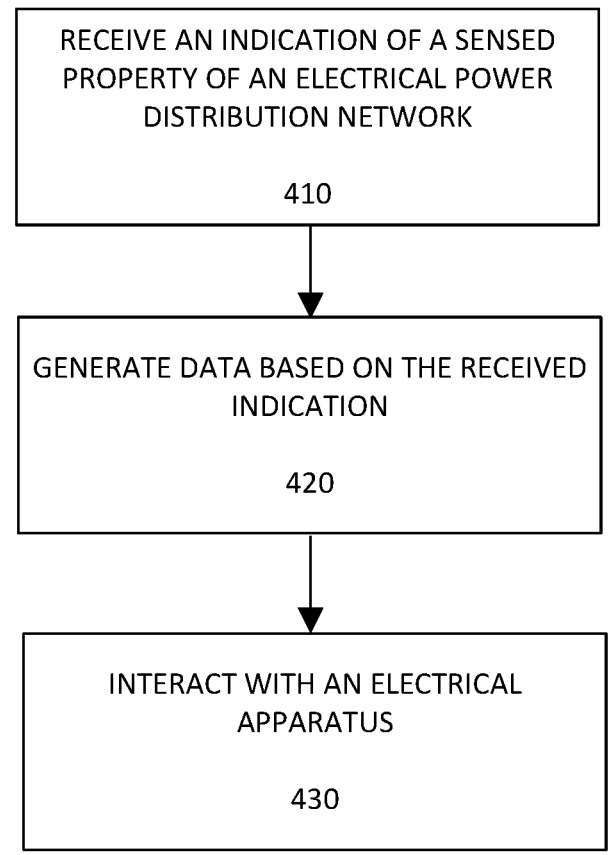
FIG. 4 is a flow chart of an example of a process for operating an electrical apparatus.

Referring to FIG. 4, a flow chart of a process 400 is shown. The process 400 is an example of a process that may be used to provide redundant operation of an electrical apparatus. The electrical apparatus may be any apparatus that is capable of controlling and/or monitoring one or more aspects an electrical power distribution network. For example, the electrical apparatus may be a system or apparatus that is capable of monitoring or controlling one or more of current flow, a voltage level, and a phase or frequency of electricity in the electrical power distribution network 101.

The electrical apparatus may be the electrical apparatus 110, 210, 310A, or 310B. The process 400 may be performed by the control system 130 or the control system 230 and/or by a component of such a control system, such as the command module 238. The process 400 is discussed with respect to the control system 230 and the electrical apparatus 210 and 310A.

An indication of a sensed property of the electrical power distribution network 101 is received (410). The properties of the network 101 may include any characteristic that may be used to gauge the status or performance of the network 101. For example, the properties of the network 101 may include the current flowing through the transmission path 104 or a voltage level at the electrical loads 103. The indication of the sensed property may be an indication of an amount of current that flows in the transmission path 104 or a voltage level at a point on the transmission path 104.

The sensed property of the network 101 may be measured or determined by, for example, the conditioning module 234. The conditioning module 234 may receive current from the transmission path 104 and sense the amount of current at a current transformer or other current sensing device. Other properties of the network 101, such as voltage, may be sensed alternatively or in addition to the current.

Data is generated based on the indication of the sensed property (420). As discussed above, the conditioning module 234 may include a current sensing device, a voltage sensing device, filters and other conditioning devices, and an ADC. The current received from the transmission path 104 may be an analog signal, and the signal may be conditioned (for example filtered) and/or converted to a signal that includes discrete values by passing the analog signal through an ADC. The result of conditioning (if any), and the output of the ADC may be considered to be data generated based on the indication of the sensed property of the network 101.

The command module 238 interacts with the electrical apparatus 210 (430). For example, the command module 238 may generate the command signal 232 based on the data from the conditioning module 238 and provide the command signal 232 to the electrical apparatus 210. Because the processing module 240 includes more than one electronic processor, the command module 238 is able to generate the command signal 232 (or otherwise interact with the electrical apparatus 210) even if some of the processors of the processing module 240 are unable to generate the command signal 232. In other words, at least one of the electronic processors of the processing module 240 is in a readiness state in which the command signal 232 is able to be generated. In this way, the command module 238 and the control system 230 provide redundant protection for the network 101 and/or redundant monitoring of the network 101, and the control system 230 is able to interact with the electrical apparatus 210 (for example operate the electrical apparatus 210 or receive information from the electrical apparatus 210) even when some of the processors of the processing module 240 are rebooting, powering up, reading or writing data as part of a firmware update, in an error state, or otherwise unavailable to cause the control system 230 to interact with the electrical apparatus 210.

The command module 238 also may include the processor communication interface 242, which allows the processors of the processing module 240 to communicate with each other and/or the command module 238. In some implementations, the processor communication interface 242 connects each processor of the processing module 240 to all of the other processors of the processing module 240. In some implementations, the processor communication interface 242 connects a processor in the processing module 240 to fewer than all of the processors of the processing module 240, though each processor of the processing module 240 is connected to at least one other processor of the processing module 240.

Figure 5:
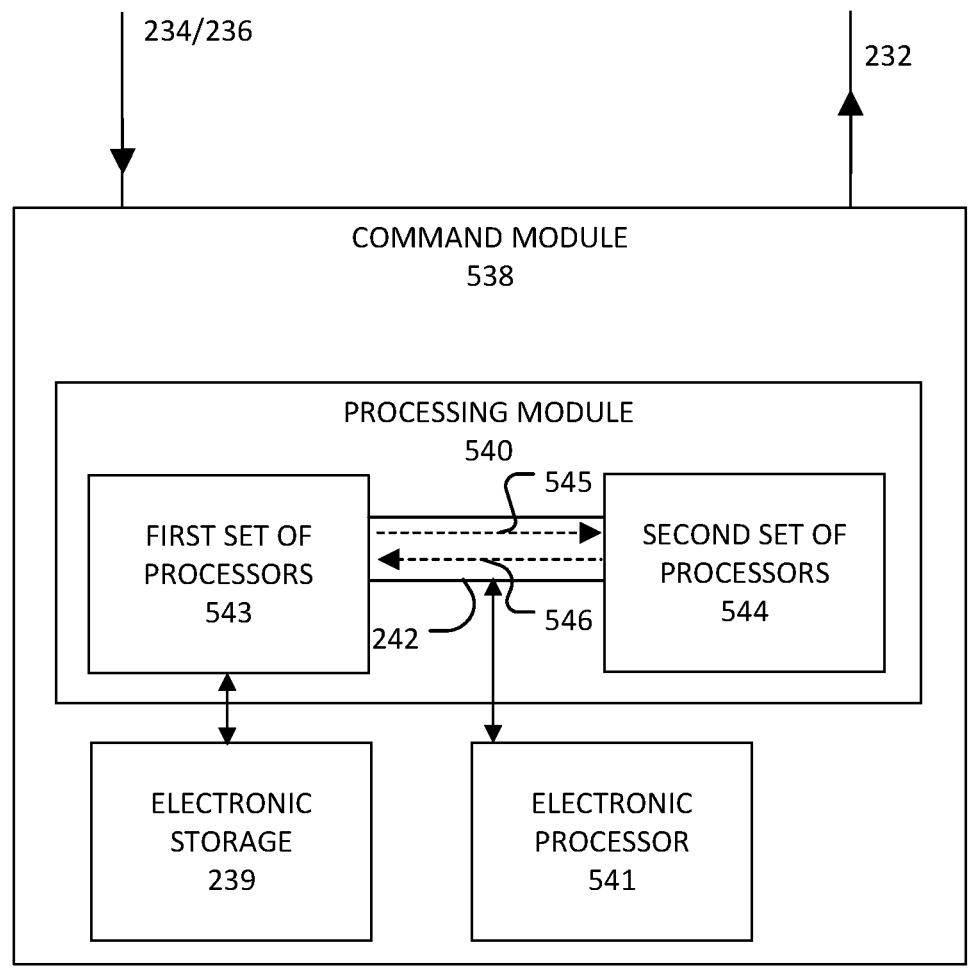
FIG. 5 is a block diagram of an example of a command module for a control system.

The processors of the processing module 240 may communicate through the interface 242 by sending a signal to another processor. The signal may cause the receiving processor to change readiness states, or the signal may poll the receiving processor for its current readiness state and return information indicating the current readiness state to the sending processor. Referring also to FIG. 5, a block diagram of a command module 538, which is an example implementation of the command module 238, is shown. The command module 538 may be used in the control system 230 in place of or in addition to the command module 238. The command module 538 has components that are similar to the components of the command module 238. In the command module 538, a processing module 540 includes a first set of electronic processors 543 and a second set of electronic processors 544. Each of the first set 543 and the second set 544 include at least one electronic processor, and may include more than one electronic processor.

The processors of the first set 543 and the second set 544 may be identical or they may have different characteristics. For example, the first set 543 and the second set 544 may include different numbers of electronic processors. In another example, the arming time of the processors in the second set of processors 544 may be less than the arming time of the processors in the first set of processors 543 and/or the processors in the second set 544 may require less power to perform in the ON readiness state than the processors of the first set 543. The processors in the first set of processors 543 may have different readiness states than the processors in the second set of processors 544. For example, the second set of processors 544 may include a low-power readiness state, whereas the first set of processors 543 may lack the low-power readiness state. Additionally, the processors within each of the sets 543 and 544 may have different characteristics than other processors within the same set.

The first set of electronic processors 543 and the second set of electronic processors 544 communicate through the processor communication interface 242. Although the interface 242 is shown as being between the first set of processors 543 and the second set of processors 544, in some implementations, any of the processors in the first set of processors 543 may communicate with any of the processors in the second set of processors 544 via the interface 242, and vice versa. Moreover, the interface 242 may be configured to allow any part of the command module 538 to communicate with all or any of the processors in the first set of processors 543 and the second set of processors 544. For example, the command module 538 may include an electronic processor 541, which includes one or more electronic processors in addition to those included in the first and second sets of processors 543, 544. In these implementations, the interface 242 may be configured to communicate with the electronic processor 541 such that the command module 538 is able to communicate with any or all of the processors in the first set of processors 543 and the second set of processors 544.

In some implementations, the interface 242 is configured such that fewer than all of the processors in the first set 543 and the second set 544 communicate directly with each other. Additionally, the interface 242 may allow communications among processors that are part of the same set. Further, the command module 538 may include more than one processor communication interface 242, and individual processors of the processing module 540 and in either of the sets 543 and 544 may be connected to communicate with each other via the interface 242 in any manner.

In the example shown in FIG. 5, a signal 545 is provided to the second set of processors 544, and a signal 546 is provided to the first set of processors 543. Although the signal 545 is shown as being provided by the first set of processors 543, and the signal 546 is shown as being provided by the second set of processors 544, either or both of the signals 545 and 546 may be provided by the electronic processor 541 of the command module 538. Moreover, either or both of the signals 545 and 546 may be received by the electronic processor 541 of the command module 538. The signals 545 and 546 may be used to change the readiness state or determine a current readiness state of the second set of processors 544 and the first set of processors 543, respectively. To illustrate the use of the signals 545 and 546, an example of coordinating the first set of processors 543 and the second set of processors 544 to protect the electrical loads 103 with the electrical apparatus 310A (FIG. 3A) is discussed with respect to FIG. 5.

Data based on an indication of a sensed property of the power distribution network 101 may be received at the command module 538 from the conditioning module 234 (FIG. 2). In this example, the data indicates that there is an overcurrent condition on the transmission path 104. In response to receiving the data, the command module 538 generates the command signal 232 for the electrical apparatus 310A using the processing module 540. The command signal 232 is based on the received data. Thus, in this example, because the data indicates that an overcurrent condition exists on the transmission path 104, the command signal 232 is sufficient to cause the contacts 311 of the electrical apparatus 310A to disconnect to open the transmission path 104 and protect the electrical loads 103 from the over current condition.

To generate the command signal 232 in this example, the command module 538 polls the first set of processors 543 to determine their readiness state (for example, the electronic processor 541 may poll the first set of processors 543). In this example, the first set of processors 543 is reading and writing data to the electronic storage 239 due to, for example, a firmware update, and the processors of the first set of processors 543 are in a readiness state that is unable to generate the command signal 232. Thus, the second set of processors 544 is tasked to generate the command signal 232. The electronic processor 541 of the command module 538 sends the signal 545 to the second set of processors 544 to determine the current readiness state of the second set of processors 544. The second set of processors 544 provides its current readiness state to the command module 538 via the signal 546. If the processors of the second set of processors 544 are not in a readiness state that is able to generate the command signal 232, the command module 538 may send a signal to the second set of processors 544 to transition the second set of processors 544 to a readiness state in which the command signal 232 is able to be generated. For example, if the second set of processors 544 is in a sleep state, the processors 544 may be transitioned to an ON readiness state by a "wake up" signal from the electronic processor 541 of the command module 538.

In this way, the command module 538 is able to coordinate the processors of the processing module 540 to ensure that the command signal 232 is generated even when the first set of processors 543 is unable to generate the command signal 232. In some implementations, the first set of processors 543 is able to send the signal 545 to the second set of processors 544 even though the first set of processors 543 is unable to generate the command signal 232.

In instances in which the first set of processors 543 is capable of sending the signal 545, the first set of processors 543 may be triggered to send the signal 545 to the second set of processors 544 by the command module 538. The command module 538 may trigger the first set of processors 543 in response to receiving the data from the conditioning module 234. In some implementations, the command module 538 may trigger the first set of processors 543 to issue the signal 545 in response to an input to the I/O interface 236, such as a command from an operator of the control system 230. Similarly, in instances in which the second set of processors 544 is capable of sending the signal 546, the command module 538 may trigger the second set of processors 544 to send the signal 546 in response to receiving data from the conditioning module 234, or in response to input to the I/O interface 236. Moreover, the command module 538 may trigger the processors of the processing module 540 based on a computer program stored on the electronic storage 239.

Furthermore, in some implementations, the command module 538 is able to generate different types of command signals 232 for the electrical apparatus 210. Each of the different types of command signals 232 may cause the electrical apparatus 210 to perform different control or monitoring functions. For example, the electrical apparatus 210 may be a recloser that has components similar to the electrical apparatus 310A (FIG. 3A). The command signals for the recloser may include a command to control the flow of electricity in the transmission path 104 when a fault condition is detected by the conditioning module 234 by disconnecting the contacts 311 and reconnecting the contacts 311 after a set amount of time, and disconnecting the contacts after the reconnection if the fault condition persists on the transmission path 104. Additionally, the command signals for the recloser also may include other types of command signals for the recloser, such as command signals that monitor the network 101 by obtaining the amount of current flowing through the connected contacts 311.

The processors of the processing module 540 may be able to generate all of the types of command signals for the recloser in some of the readiness states, and only some of the command signals in other readiness states. For example, the processors of the processing module 540 may be able to generate the command signal to monitor the network 101 in the ON readiness state and the low-power readiness state, but may be able to generate the command signal to control the current flow in the transmission path 104 only in the ON readiness state.

As noted above, the process 400 is an example of a process for providing redundant operation of the electrical apparatus. Additional processes for providing redundant operation of an electrical apparatus, a system that includes an electrical apparatus, or a system that monitors an electrical apparatus are possible. For example, the asset monitoring system 335 (FIG. 3C), may be operated in a redundant manner. The asset monitoring system 335 monitors an asset of the electrical power distribution network 101 and provides information based on the monitoring to the control system 130.

The control system 130 includes the processing module 140, which includes more than one electronic processor. The processors of the processing module 140 may be coordinated in a manner similar to that discussed above with respect to FIG. 5 to ensure that the processing module 140 is always able to cause the control system 130 to interact with the asset monitoring system 335. For example, if none of the processors of the processing module 140 are in a readiness state in which the processors are capable of causing the control system 130 to interact with the asset monitoring system 335, the control system 130 and/or some of the processors may send a state-change signal to one or more of the other processors to cause the processors to change to a state in which the processors are able to cause the control system 130 to interact with the asset monitoring system 335.

The control system 130 may interact with the asset monitoring system 335 by receiving information from the asset monitoring system 335. Additionally, in some implementations, the control system 130 also may send information (such as a command signal) to the asset monitoring system 335. Due to the configuration of the control system 130 and the processing module 140, when some of the electronic processors of the processing module 140 are not able to cause the control system 130 to receive the information from the asset monitoring system 335, others of the electronic processors are able to cause the control system 130 to receive the information. In this way, the asset monitoring system 335 may be operated in a redundant manner and is able to provide robust monitoring of an aspect of the network 101 (an asset in the network 101 in this example).

Referring to FIG. 6, a flow chart of an example process 600 is shown. The process 600 is used to operate an electrical apparatus. In particular, the process 600 may be used to place a control system that controls the electrical apparatus into a conservation mode that consumes less power than a typical operating mode. The process 600 may be used to, for example, prolong the life of a back-up energy source while still permitting the electrical apparatus to monitor and/or control an electrical power distribution network.

The electrical apparatus may be any apparatus that is capable of controlling and/or monitoring one or more aspects an electrical power distribution network. For example, the electrical apparatus may be a system or apparatus that is capable of monitoring or controlling one or more of current flow, a voltage level, and a phase or frequency of electricity in the electrical power distribution network 101. The electrical apparatus may be, for example, the electrical apparatus 110, 210, 310A, or 310B. The process 600 may be performed by the control system 130 or the control system 230 and/or by a component of such a control system, such as the command module 238. The process 600 is discussed with respect to the control system 230 and the electrical apparatus 210.

It is determined whether the power is received from the network 101 or the back-up energy source 250 (610). As discussed with respect to FIG. 2, under normal operating conditions of the electrical power distribution network 101, the system 205 (the control system 230 and the electrical apparatus 210) receives power from the network 101. However, during a fault condition, power outage, or other service interruption, electricity does not flow in the transmission path 104 and the network 101, and the control system 230 does not receive power from the network 101. When the control system 230 does not receive power from the network 101, the control system 230 may be powered by the back-up energy source 250.

Although the back-up energy source 250 may be capable of being recharged or otherwise refreshed after the service outage, the back-up energy source 250 has a limited supply of energy available for the control system 230. Thus, it is desirable to reduce the amount of energy used by the control system 230 so that the electrical apparatus 210 is able to provide protection and/or monitoring capability to the power distribution network 101 for as long as possible during a prolonged service outage. Additionally, increasing the lifetime of the back-up energy source 250 also helps to ensure that the system 205 is receiving power and is able to protect and/or monitor the electrical loads 103 at the moment when service is restored to the network 101. Even after service is restored, it is possible that the network 101 is unable to provide power to the system 205. For example, a fault condition may still exist on the transmission path 104. As such, the system 205 may continue to need to rely on the back-up energy source 250 for power even after the service outage ends.

The command module 238 of the control system 230 includes the processing module 240. Each of the processors of the processing module 240 has readiness states, and the various readiness states consume different amounts of power and are capable of different operations. Thus, the energy consumption of the control system 230 may be controlled through the readiness states of the processors, taking into account the limitations and capabilities of a processor in each readiness state to ensure that the control system 230 is able to function as expected under the circumstances.

As such, when the power is provided by the back-up energy source 250, at least some of the electronic processors of the processing module 240 are placed in a readiness state that consumes less power than at least one of the other readiness states (620). This allows the control system 230 to consume less power, but the control system 230 is still capable of generating the command signal 232 or providing other functionality. For example, some of the processors of the processing module 240 may be placed in the OFF readiness state while some of the processors of the processing module 240 remain in the ON readiness state. The processors that remain in the ON readiness state are able to generate the command signal 232. In another example, some of the electronic processors may be placed in the OFF readiness state, some in the low-power readiness state, and some processors may remain or may be placed in the ON readiness state. In this example, the processors that are in the ON readiness state are able to generate the command signal 232.

Thus, in the conservation mode, the control system 230 may generate a command signal 232 to control or monitor aspects of the power distribution network 101, including being able to provide diagnostic or status information relating to the electrical apparatus 210 while the control system 230 operates in the conservation mode. For example, in an implementation in which the electrical apparatus 210 is a circuit breaker, switch, or a recloser (such as the electrical apparatus 310A), the command signal 232 may obtain the status of the contacts 311 or another component of the electrical apparatus 310A and return the status to the control system 230. The control system 230 may present the status at the I/O interface 236 or at the remote station 260. In another example, the control system 230 may determine that the contacts 311 are open and may generate a command signal 232 that causes the contacts to close and then reopen if the fault condition still exists on the transmission path 104. In yet another example, in an implementation in which the electrical apparatus is an asset monitoring system (such as the asset monitoring system 335 of FIG. 3C), the control system 230 is able to receive and process information from the asset monitoring system 335 while the control system 230 is in the conservation mode.

In some implementations, to change the readiness state of some of the processors of the processing module 240, the command module 238 issues a trigger signal to the processors that are to change readiness states when the control system 230 receives power from the back-up energy source 250. Alternatively or additionally, the trigger signal to change readiness states may be provided by one of the processors of the processing module 240 to another processor of the processing module 240 via the processor communication interface 242 when the control system 230 receives power from the back-up energy source 250.

The readiness states that the processors of the processing module 240 are to be placed in when the control system 230 receives power from the back-up energy source 250 may be indicated in a configuration file or computer program. The configuration file or computer program may be stored on the electronic storage 239 or may be received through the I/O interface 236. The configuration file or computer program may specify one or more readiness state for each of the processors of the processing module 240 to operate in when the control system 230 receives power from the back-up energy source 250. The configuration file or computer program may be updated or replaced by an operator through the I/O interface 236.

In some implementations, the configuration file or computer program may specify that the processors of the processing module 240 be placed in the specified readiness states after a certain amount of time has passed since the network 101 stopped providing power to the system 205. This time is referred to as the "wait time." For example, the configuration file or computer program may specify that the processors not be placed in the specified readiness states for several minutes or hours after the network 101 stops providing power to the system 205 (and after the back-up energy source 250 starts providing power to the system 205). Thus, although the command module 238 places at least one of the processors of the processing module 240 in a readiness state that consumes less power when the back-up energy source 250 provides power to the system 205, the processors are not necessarily placed in that readiness state immediately after the back-up energy source 250 begins to provide power to the system 205. Additionally, in some implementations, the operator of the system 205 may specify the wait time through the I/O interface 236.

Further, the configuration file or computer program may specify that all or most of the processors of the processing module 240 transition to the OFF readiness state or the sleep state after a certain amount of time (a "power down time") has passed since the network 101 stopped providing power. The "power down time" may be a time that is selected based on the expected amount of time that the back-up energy source 250 is able to provide power. The "power down time" period and configuration also may be entered into the control system using the VO interface 236. Additionally, the control system 230 may provide a warning that is perceivable to the operator at the I/O interface 236 or the remote station 260 when the "power down time" is imminent.

Additionally, even in situations in which the control system 230 does not generate the command signal 232, the control system 230 is able to provide other functionality when in the conservation mode. For example, when the control system 230 receives power from the back-up energy source 250, all of the processors of the processing module 240 may be placed in the OFF readiness state except for one processor that is in a low-power readiness state. The processor in the low-power readiness state is able to respond to a "wake up" signal from, for example, the conditioning module 234 or the I/O interface 236. After the processor receives the "wake up" signal, the processor that was woken up provides "wake up" signals to all of the processors that are in the OFF readiness state. In this example, the command module 238 does not necessarily generate the command signal 232 for the electrical apparatus 210, but instead one of the processors of the processing module 238 generated a signal that caused the other processors of the command module 238 to transition into a different readiness state, which may allow the control system 230 to provide more functionality.

Other features are within the scope of the claims. For example, in some implementations, the control system 230 includes more than one conditioning module 234. The various conditioning modules may be associated with different of the electronic processors of the processing module 240. For example, one of the conditioning modules may be associated with the first set of electronic processors 543 (FIG. 5), and another of the conditioning modules may be associated with the second set of electronic processors 544 (FIG. 5). The various conditioning modules may have the same features and capabilities, or the features and capabilities of the various conditioning modules may be different. For example, the various conditioning modules may be configured to sense different properties of the electrical power distribution network 101. For example, one of the conditioning modules may be configured to sense a voltage level of the electrical power distribution network 101, another may be configured to sense an amount of current flowing in the transmission path 104, and yet another may be configured to sense both current and voltage.

What is claimed is:

1. A system comprising:
an electrical apparatus configured to control or monitor one or more aspects of a power distribution network; and
a control system configured to interact with the electrical apparatus, and the control system configured to receive power from the power distribution network or from a back-up energy source, the control system comprising:
a command module comprising more than one electronic processor, each of the electronic processors having a plurality of readiness states, the electronic processors consuming different amounts of power in each readiness state, and, when the control system receives power from the back-up energy source, the command module is configured to place at least some of the electronic processors in one of the plurality of readiness states, at least some of the electronic processors being placed in a readiness state in which the electronic processors consume less power than the electronic processors consume in at least one other readiness state.

2. The system of claim 1, wherein
the control system being configured to interact with the electrical apparatus comprises the control system being configured to provide different types of command signals to the electrical apparatus, the command signals being sufficient to cause the electrical apparatus to control or monitor one or more aspects of the electrical power distribution network, and when the control system receives power from the back-up energy source, the command module is able to generate at least one command signal for the electrical apparatus, and
the readiness states include a first readiness state, a second readiness state, and a third readiness state, the electronic processors consuming less power in the third readiness state than in the first readiness state and less power in the second readiness state than the third readiness state, and, when the control system receives power from the back-up energy source, at least some of the electronic processors are placed in the second readiness state or the third readiness state.

3. The system of claim 1, wherein, the command module is configured to place at least some of the electronic processors in the one of the plurality of readiness states after a pre-determined amount of time has passed since the control system started receiving power from the back-up energy source.

4. A method of operating an electrical apparatus in an electrical power distribution network, the method comprising:
interacting with the electrical apparatus at a command module of a control system, the command module comprising a plurality of electronic processors, each of the plurality of electronic processors being associated with a plurality of readiness states, and at least one of the plurality of electronic processors being in a readiness state in which the electronic processors are able to interact with the electrical apparatus and at least one of the plurality of electronic processors being in a readiness state in which the electronic processors are not able to interact with the electronic processor, wherein the electrical apparatus is configured to monitor or control one or more aspects of the electrical power distribution network,
interacting with the electrical apparatus comprises one or more of sending information to the electrical apparatus and receiving data from the electrical apparatus;
receiving an indication of a sensed property of the electrical power distribution network;
generating data based on the received indication; and
generating a command signal based on the generated data, wherein interacting with the electrical apparatus comprises causing the command module to send the command signal to the electrical apparatus, the electrical apparatus configured to control or monitor one or more aspects of the electrical power distribution network in response to receiving the command signal.

5. A control system for use with an electrical apparatus that controls or monitors one or more aspects of an electrical power distribution network, the control system comprising:
a command module comprising a plurality of electronic processors, the electronic processors being associated with a plurality of readiness states, each readiness state defining a scope of operations that the electronic processors are able to perform when in the readiness state; and
a processor communication interface, the processor communication interface connecting the electronic processors and being configured to provide data from any of the electronic processors to any other electronic processors, wherein
the control system is configured to receive power from one of the electrical power distribution network and a back-up energy source, and
when the control system receives power from the back-up energy source, at least some of the electronic processors are placed in a readiness state that consumes less power than at least one other readiness state.

* * * * *